United States Patent [19]

Hines et al.

[11] 4,086,648

[45] Apr. 25, 1978

[54] PROTECTOR MODULE

[75] Inventors: William Hines, Arlington Heights; Eric A. Scheithauer, Chicago; Casimir Cwirzen, Arlington Heights, all of Ill.

[73] Assignee: Cook Electric Company, Morton Grove, Ill.

[21] Appl. No.: 737,326

[22] Filed: Nov. 1, 1976

[51] Int. Cl.[2] .................................................. H02H 3/22

[52] U.S. Cl. ..................................... 361/124; 361/120; 337/32

[58] Field of Search ............... 361/124, 125, 120, 117, 361/129, 56; 337/32, 31, 28, 33, 34, 15, 17, 18

[56] References Cited

U.S. PATENT DOCUMENTS

| | | | |
|---|---|---|---|
| 2,724,793 | 11/1955 | Fisher | 361/124 |
| 3,975,664 | 8/1976 | Baumbach | 361/124 |

*Primary Examiner*—Patrick R. Salce
*Attorney, Agent, or Firm*—Mason, Kolehmainen, Rathburn & Wyss

[57] ABSTRACT

A protector module for use in protecting telephone lines includes an insulating base with two sets of line pins and a ground pin extending from one side of the base. Disposed on the other side of the base is a pair of spaced apart line contacts with one of the line contacts being coupled to one set of line pins and the other line contact being coupled to the other set of line pins and a ground clip assembly coupled to the ground pin and disposed between the line contacts. The ground clip assembly mounts a three electrode gas tube arrester having a pair of line electrodes and a ground electrode such that one of the line contacts is coupled to one of the line electrodes by a fusible element and the other line contact is coupled to the other line electrode by another fusible element. In response to a fault condition occurring on the telephone line coupled to one of the line contacts, the fusible element between that line contact and the line electrode melts, allowing the line contact to move toward the ground clip assembly such that the line contact makes electrical contact with the ground clip assembly. In one embodiment of the protector module, an insulating housing is detachably secured to the base in order to enclose the ground clip assembly, the line contacts, the gas tube arrester and the fusible elements.

20 Claims, 7 Drawing Figures

PROTECTOR MODULE

The present invention relates to protector assemblies or modules for use in connectors and more particularly to a new and improved plug-in type protector module in which a three electrode gas tube arrester is utilized and a metallic shunt circuit is provided for certain power fault conditions.

Each telephone line in a telephone system must be protected from high voltages and surge currents that might occur on the telephone lines and that could damage telephone equipment to which the lines are coupled. In the case of telephone equipment located in a telephone central office or at a private branch exchange location, a plug-in type protector assembly or module is utilized to connect each of the telephone lines to the telephone equipment as well as to protect those telephone lines from high voltages or surge currents occurring on the line. The protector module contains some type of arrester or arresters which are coupled between the telephone lines and a ground potential. When a high voltage or current surge occurs on the telephone line to which the arrester is coupled, a spark gap in the arrester coupled to that line sparks over so that the telephone line is coupled directly to ground potential through the arrester. In this manner, the telephone equipment that is coupled to the telephone line is protected and does not receive any damaging potential.

The protector modules or assemblies are normally mounted on connectors or connector blocks such that the connector forms an electrical terminating juncture interface between the incoming cables from subscriber telephones and electrical conductors to the central office switching equipment or equipment located in a private branch exchange. For instance, one such type of electrical connector forming the interface between the telephone lines and such equipment is disclosed in U.S. Pat. No. 3,947,732, assigned to the assignee of record of the present application. This connector is normally utilized at a telephone central office location. In those installations having a lesser number of incoming lines, for instance at a private branch exchange or for carrier or special service circuits, a smaller type of connector is used as an interface between the telephone lines and the equipment. One such type of smaller connector is disclosed in U.S. Pat. No. 3,936,133, also assigned to the same assignee of record of the present application.

No matter which of the connectors are utilized, there are various types of protector modules which have been utilized to provide the connection of the outside or incoming telephone lines to the central office equipment as well as to provide the protection from the high voltages or surge currents. For the most part, the outer configurations of these protector modules are quite similar (see for instance the aforementioned U.S. Pat. Nos. 3,947,732 and 3,936,133) even though various types of carbon or gas tube arresters have been utilized in them to provide the needed protection.

More specifically, the protector module has a base with a pair of pins (sometimes referred to as the outside plant pins) extending from one side of the base to be coupled to the outside plant conductors (i.e. the tip and ring lines that are extended into the telephone central office). Another pair of pins (sometimes referred to as the central office pins) also extend from that side of the base, and each is coupled to one of the outside plant pins and is designed to be coupled to the central office equipment. A fifth pin extending from the base is designed to be coupled to ground potential and also serves as a polarization pin so that the module can only be plugged in the connector base in the appropriate configuration. In some instances, another pin extends from the base of the protector module to provide this polarization function.

In order to enclose the various components mounted on or disposed adjacent to the other side of the base, a generally rectangularly shaped plastic housing or shell is snap fastened to the base. A finger grip portion is disposed at the end of the shell opposite to the base, which grip enables personnel to readily plug in or out the protector module from the connector.

As previously indicated, various types of protection devices or arresters have been utilized in the shell of the protector module to provide the required protection. One type of arrester so utilized is a two electrode carbon arrester. When such an arrester is utilized, a spark gap is formed between a carbon line electrode coupled to one of the outside plant pins and thereby to one of the telephone lines to be protected and a carbon ground electrode coupled to the ground pin. Whenever the spark gap is sparked over due to a high voltage surge on the telephone line, any surge current flowing on the protected line is coupled to ground potential instead of to telephone equipment coupled to the central office pins.

Obviously, a pair of carbon arresters must be used to protect the pair of lines coupled to each pair of outside plant pins. In addition, in some protector modules, normally open metallic shunt circuits are connected across the spark gap of the carbon arrester between each of the telephone lines and ground. In the event of certain types of power faults, a fusible pellet melts, allowing the metallic shunts to close the circuit in order to permanently connect the telephone lines to ground potential. Other protector modules also utilize a heat coil coupled in series with the telephone lines to affect the shorting of the metallic shunts between the ground terminal and the telephone lines.

In lieu of the carbon arresters, various ones of the protector modules have utilized two electrode gas tube arresters. Various ones of the two electrode gas tubes have a pair of opposed electrodes hermetically sealed in opposite ends of an insulating spacer tube. Each of these electrodes have a portion extending into the spacer tube so that a spark gap is formed in the gas chamber within the spacer tube. In order to protect one of the telephone lines, one of the electrodes is connected via one of the outside plant pins to the telephone line to be protected, and the other electrode is connected via the ground pin to ground potential. Whenever a high voltage of sufficient magnitude appears on the line connected to the one electrode, the spark gap within the insulating spacer breaks down. In this manner, the electrodes are coupled together and the high voltage which was on the telephone line is coupled through the electrodes and the spark gap to ground potential.

As was the case with respect to the utilization of carbon arresters, a pair of two electrode gas tube arresters must be used to protect each pair of telephone lines extending between the remote location and the telephone central office. When each of the lines in a pair of lines is protected by an individual two electrode gas tube arrester, the likelihood of both spark gaps electrically breaking down at precisely the same voltage is coincidental. Consequently, when one of the two two electrode gas tube arresters sparks over due to a high voltage or surge current on the line coupled to that arrester, the other gas tube arrester might still not break down even though there is a substantial voltage on the line connected to that gas tube arrester. As a result, when this happens a rather substantial line to line voltage may result, which voltage would be impressed across the equipment being protected by these devices.

More recently, three electrode gas tube arresters have also been utilized in various other applications to protect telephone lines and the like from high voltages or surge currents occurring on the telephone lines. These three electrode gas tube arresters will normally have a pair of line electrodes that are connected by a pair of insulating spacer members at opposite ends of a central ground electrode. Each of the two line electrodes of the three electrode gas tube arresters is configured such that a spark gap is formed between each of these line electrodes and the central ground electrode. In order to protect a pair of telephone lines, one of the lines is connected to one of the line electrodes and the other line is connected to the other line electrode. When a high voltage occurs on one of the pairs of telephone lines, the spark gap between the line electrode coupled to that line and the ground electrode sparks over such that the line is coupled to ground potential and is thereby protected.

Moreover, since the spark gap between that line electrode and the ground electrode is in the same cavity as the spark gap between the other line electrode and the ground electrode, the other spark gap will tend to spark over at a lesser voltage and in a shorter period of time than it would if the first spark gap had not already broken down because the spark gap has already become slightly ionized so that it will be more readily sparked over in response to a voltage on the line coupled to the other line electrode. As a result, there is very little chance of a substantial line to line voltage being present such that only negligible line to line voltages would be impressed across the equipment to be protected.

Accordingly, objects of the present invention are to provide a new and improved protector module or assembly that utilizes three electrode gas tube arresters to protect pairs of telephone lines from high voltages or surge currents; that contains a shorting mechanism to shunt the telephone lines to ground potential through a metallic shunt in the event of a sustained power fault; that includes a ground clip assembly which couples the ground electrode of a three electrode gas tube arrester to ground potential as well as mounts the three electrode gas tube arrester in the protector module in a spaced apart manner to the base of the module; that includes the same basic configuration of the base and shell of previously available protector modules while utilizing a three electrode gas tube arrester; and that includes line contacts attached to the base of the module which connect the line electrodes of the gas tube arrester to the lines to be protected and provide a metallic shunt circuit to ground for the telephone lines in the event of certain fault conditions.

In accordance with these and many other objects of the present invention, an embodiment of the present invention comprises a plug-in type protector module for protecting pairs of telephone lines at a telephone central office, private branch exchange or the like from high voltages or surge currents occurring on the telephone lines while connecting those lines to telephone office equipment. The protector module has a base made of a high dielectric material with two sets of central office and outside plant line pins and a ground pin extending from one side of the base in order to plug the module into a connector forming an interface between the telephone lines and the telephone equipment. On the other side of the base, each of a pair of spaced apart line contacts is coupled to one set of the line pins and a ground clip assembly is coupled the ground pin. A three electrode gas tube arrester having a pair of line electrodes and a ground electrode is mounted relative to the base by the ground clip assembly such that one of the line contacts is coupled to one of the line electrodes by a fusible element, which also normally maintains that line contact in spaced apart relationship to the ground clip assembly. The other line contact is similarly coupled to the other line electrode. In response to a particular fault condition occurring on one of the telephone lines, the fusible element melts, allowing the contact coupled to the telephone line to move toward the ground clip assembly so as to permanently couple the line contact and thereby the line pin to ground potential. In the preferred embodiment, an insulated shell is snap fitted to the base in order to encompass the ground clip assembly, the line contacts, the gas tube arrester and the fusible elements.

Many other objects and advantages of the present invention will become apparent from the following detailed description in conjunction with the following drawings in which.

Figure 1:
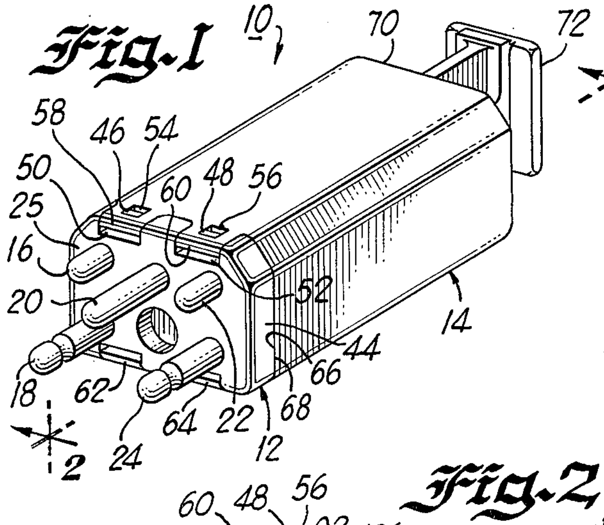
FIG. 1 is a perspective view of the protector module embodying the present invention.
Figure 5:
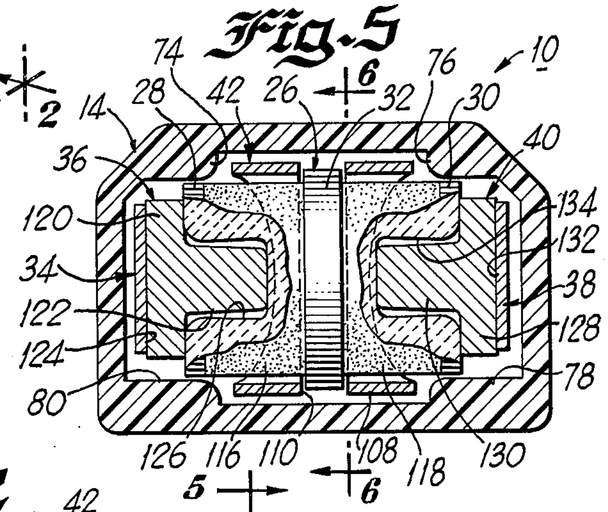
FIG. 5 is a cross-sectional view of the protector module of FIG. 2 taken along line 5—5 of FIG. 2.
Figure 2:
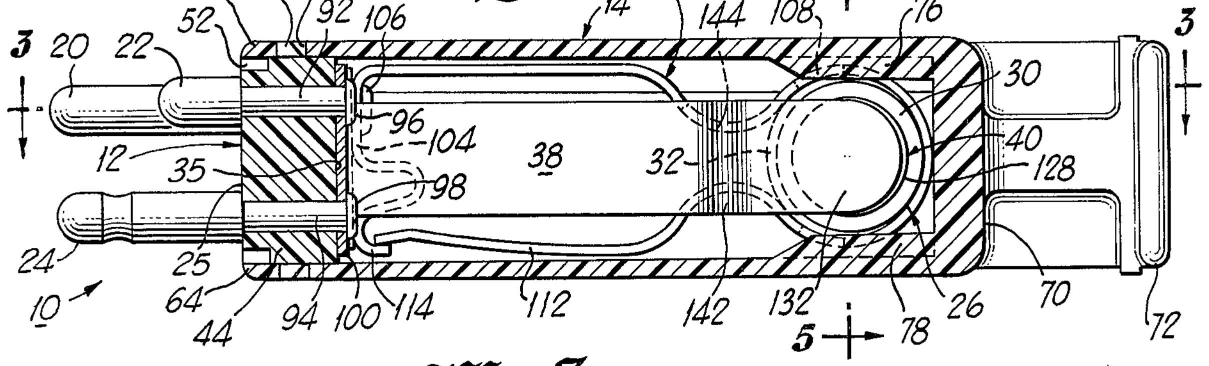
FIG. 2 is a cross-sectional view taken along line 2—2 of FIG. 1.

Referring now more specifically to FIG. 1 of the drawings, therein is disclosed a protector module or assembly which is generally referred to by the numeral 10 and which embodies the present invention. The protector module 10 includes a base 12 and a shell or housing 14 detachably attached to the base 12. Line terminals or pins 16, 18, 20, 22 and 24 extend from a side 25 of the base 12 and are designed to mount the protector 10 on connectors such as the type shown in U.S. Pat. No. 3,947,732. When mounted on such connectors, the protector module 10 connects a pair of incoming telephone lines at a telephone central office or the like to central office switching equipment or similar such equipment because the pins 18 and 24 are each coupled to one of the telephone lines and to the pins 16 and 22, respectively, which in turn are coupled to the equipment in the telephone central office. Consequently, the pins 18 and 24 are sometimes referred to as outside plant terminals or pins and the pins 16 and 22 are sometimes referred to as central office terminals or pins. The pin 20 is designed to be connected to ground potential by means of the connector on which the protector module 10 is mounted.

The protector module 10 is not only designed to connect the outside plant or incoming telephone lines to the inside plant lines or equipment, but also to protect these lines from high voltages or surge currents occurring on these telephone lines. In order to so protect the telephone lines connected to the pins 18 and 24 and as shown in more detail in FIGS. 2-7, there is located in the protector module 10, and more particularly within the shell 14, a gas tube arrester 26. The gas tube arrester 26 is a three electrode gas tube arrester having line electrodes 28 and 30 and a ground electrode 32. The line electrode 28 is coupled to the terminals 16 and 18 through a contact 34 extending from a side 35 of the base 12 and a fusible element 36. The line electrode 30 is similarly connected to the terminals 22 and 24 by a contact 38 extending from the side 35 of the base 12 and a fusible element 40. The ground electrode 32 is coupled to the ground terminal 20 through a ground clip assembly 42.

In the event that a high voltage or surge current occurs, for instance, on the telephone line coupled to the pin 24, the voltage is transmitted through the contact 38 and the fusible element 40 to the line electrode 30. If the voltage is of sufficient magnitude, a spark gap in the gas tube arrester 26 between the line electrode 30 and the ground electrode 32 is sparked over or short circuited such that the voltage is diverted to ground potential through the ground clip assembly 42 and the ground terminal 20. As a result, central office equipment connected to the pin 22 is not affected or damaged.

Figure 4:
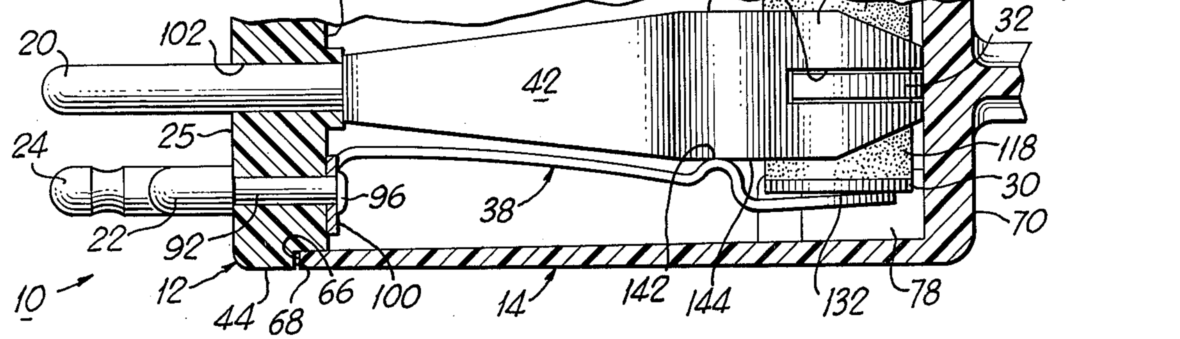
FIG. 4 is a cross-sectional view partially cut away of the protector module of FIG. 3 with one of the line contacts engaging the ground clip assembly due to the melting of a fusible element.
Figures 6, 7:
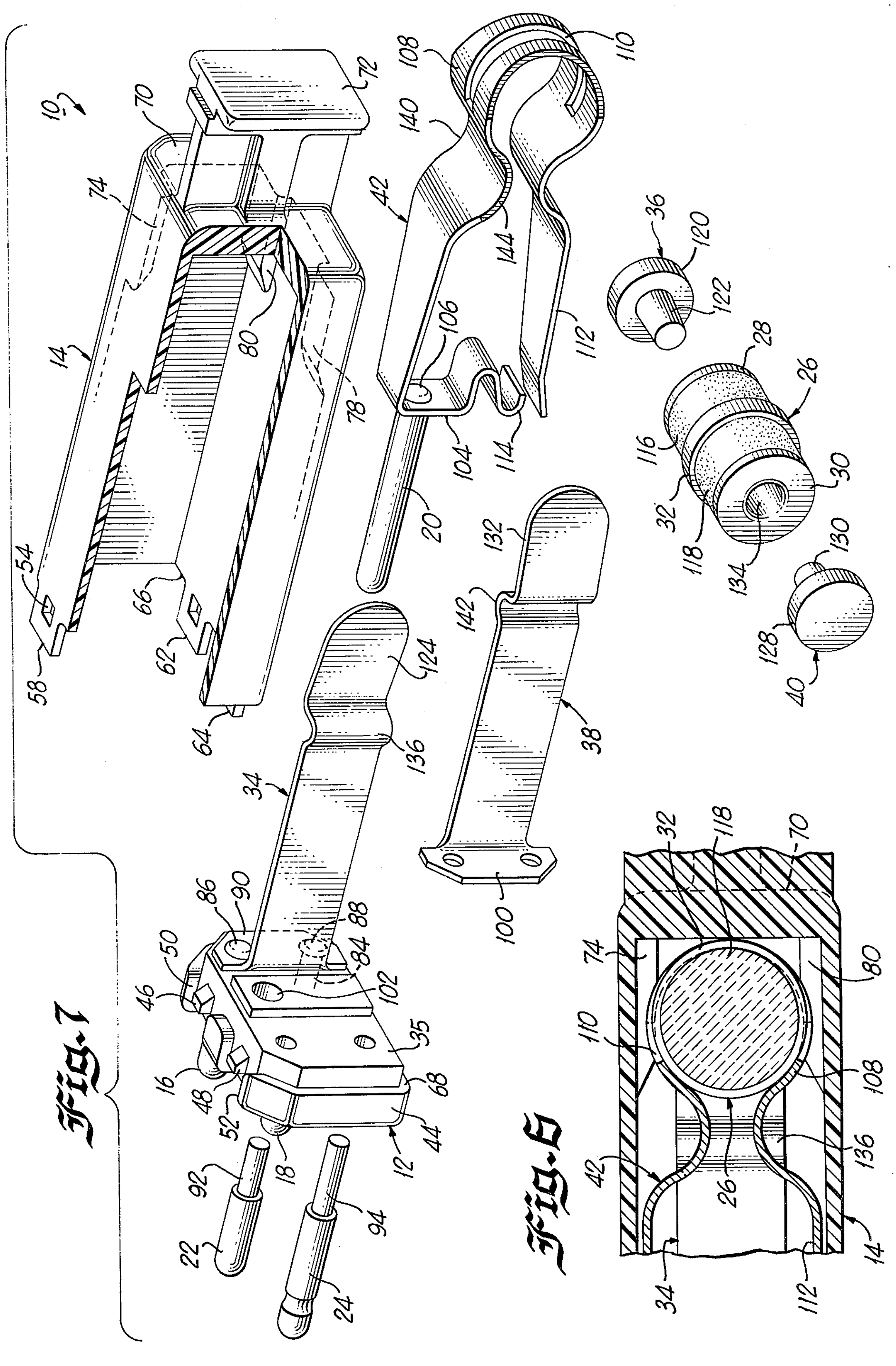
FIG. 6 is a partially cut away cross-sectional view of the protector module of FIG. 5 taken along line 6—6 of FIG. 5.
FIG. 7 is an exploded perspective view of the protector module of FIG. 1 with the shell or the housing of the protector module partially cut away.

In certain instances, a sustained overvoltage occurs on the line coupled to the terminal 24 such that the fusible element 40 melts. In this event, the contact 38, which is normally maintained separated from the ground clip assembly 42 by the fusible element 40, moves toward the ground clip assembly 42 and makes contact with the ground clip assembly 42 as illustrated in FIG. 4 of the drawings. When this happens, terminal 24 is coupled to the ground terminal 20, or in other words ground potential, through the contact 38 and the ground clip assembly 42. Consequently, the line coupled to the pin 24 will be at ground potential through this metallic path or shunt until the protector module 10 is replaced.

More specifically, the protective module 10 is of the same general configuration of various other protector modules that have been used in connection with connector bases of the type shown in U.S. Pat. No. 3,947,732. In fact, the protector module 10 is of the same general configuration as the protector modules illustrated in that patent. The base 12 of the protector module 10 is made of a high dielectric material to provide appropriate electrical insulation for the protector module 10. The base 12 has a projecting wall portion 44 extending about the periphery of the base 12 with a pair of tangs 46 and 48 located in notches 50 and 52, respectively, in the wall 44. Similar tangs and notches are located on the opposite side of the base 12. The wall 44 and the tangs 46 and 48 provide a means by which the shell 14 can be detachably secured to the base 12.

The shell 14 is similarly made of a high dielectric material such as plastic or the like, which is designed to encompass the components located on the side 35 of the base 12 in the protector module 10. The shell 14 has slots 54 and 56 located in projecting portions 58 and 60, respectively. When mounted on the base 12, the projecting portions 58 and 60 lodge within the notches 50 and 52 respectively, and the tangs 46 and 48 are secured within the slots 54 and 56, respectively. Similarly, projecting portions 62 and 64 on the shell 14 fit within corresponding slots on the opposite side of the base 12. In this manner, the shell 14 is detachably secured to the base 12 so that an end 66 of the shell 14 lodges against an edge 68 of the wall 44.

At the opposite end 70 of the shell 14 is a gripping portion 72 which enables personnel to conveniently handle the protector module 10 to insert the protector module 10 in sockets in the connector base of the type shown in the above-referred to patent. The shell 14 has in its internal portion ribs 74, 76, 78 and 80 extending inwardly from the outside surface of the shell 14 to assist in properly locating the various components of the protector module 10 within the shell 14. These components consist of the contacts 34 and 38, the ground clip assembly 42, the fusible elements 36 and 40 and the gas tube arrester 26.

As previously indicated, the contact 34 is coupled to the pins 16 and 18. In order to so couple the contact 34 to the pins 16 and 18 and to secure the contact 34 against the side 35 of the base 12, thinned down portions 82 and 84 of the pins 16 and 18, respectively, are positioned in and through the base 12 and are formed into heads 86 and 88, respectively, to secure a leg portion 90 of the L-shaped contact 34 to the side 35 of the base 12. Similarly, narrow portions 92 and 94 of the pins 22 and 24, respectively, are positioned in and through the base 12 and have head portions 96 and 98, respectively, to secure a leg portion 100 of the L-shaped contact 38 to the base 12. On the other hand, the ground pin 20 extends through an opening 102 in the base 12 and is secured to a clip receiving portion 104 of the ground clip assembly 42 by having a head portion 106 formed at the end of the pin 20.

Figure 3:
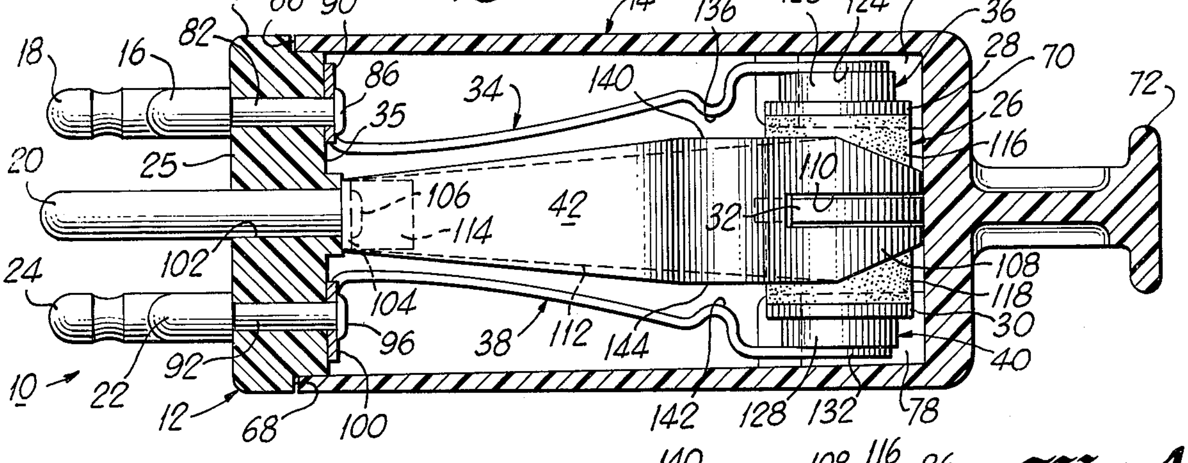
FIG. 3 is a cross-sectional view taken along line 3—3 of FIG. 2.

The ground clip assembly 42 is a conductive member and has a generally circular gas tube arrester holding portion 108 with an annular groove 110 formed therein to receive the ground electrode 32 of the gas tube arrester 26 such that the ground electrode 32 makes electrical contact with the ground clip assembly 42. As best seen in FIGS. 3 and 4, when the gas tube arrester 26 is positioned within the holding portion 108, the elongated axis of the gas tube arrester 26 is positioned in generally parallel relationship to the elongated axis of the base 12, but is spaced apart therefrom. The gas tube arrester 26 is maintained in the holding portion 108 by having a clip portion 112 of the ground clip assembly 42 positioned in a cup portion 114 formed in the clip holding portion 104. This can be best seen in FIG. 2 of the drawings.

The gas tube arrester 26 is of the general type of gas tube arresters having the line electrodes 28 and 30 separated from the ground electrode 32 by ceramic spacer tubes 116 and 118, respectively. The line electrodes 28 and 30 have portions extending into the ceramic tubes 116 and 118, respectively, such that a spark gap is formed between the line electrode 28 and the ground electrode 32, and another spark gap is formed between the line electrode 30 and the ground electrode 32. In order to couple the line electrode 28 to the contact 34, the fusible element 36, which is solder or the like and which has a disc portion 120 and a stem portion 122, is positioned between the line electrode 28 and a line contact surface 124 of the contact 34. In this manner, the stem 122 extends into a cavity 126 formed in the line electrode 28 so that the fusible element 36 is properly held in position by the force exerted on the disc portion 120 by the line contact surface 124 and the extension of the stem portion 122 into the cavity 126. Similarly, in order to couple the contact 38 to the line electrode 30, a fusible element 40, made of solder or the like and having a disc portion 128 and a stem portion 130, is positioned between the line electrode 30 and a line contact surface 132 on the contact 38 with the stem portion 130 extending into a cavity 134 in the line electrode 30. With the fusible elements 36 and 40 positioned between the line electrodes 28 and and 30 and the contact surfaces 124 and 132, respectively, the contacts 34 and 38 are maintained separate from the ground clip assembly 42. As a result, a ground contact surface 136 on the contact 34 is positioned in spaced apart relationship to a corresponding ground contact surface 140 on the ground clip assembly 42. Likewise, with the fusible element 40 positioned between the line electrode 30 and the line contact surface 132, a ground contact surface 142 on the contact 38 is positioned in spaced apart relationship to a ground contact surface 144 on the ground clip assembly 42.

As illustrated in connection with the telephone line coupled to the pin 24, in the event that a high voltage or surge current occurs on either of the telephone lines coupled to the pins 18 and 24, the high voltage is coupled through the pin 24, the contact 38, and particularly the line contact surface 132, and the disc portion 128 of the fusible element 40 to the line electrode 30. If this high voltage is of sufficient magnitude, the spark gap between the line electrode 30 and the ground electrode 32 of the gas tube arrester 26 sparks over or short circuits such that this high voltage is transmitted to the holding portion 108 of the ground clip assembly 42. Since the ground clip assembly 42 is coupled to the pin 20, which in turn is coupled to ground potential, this high voltage is diverted to ground potential. If this voltage is of sustained duration, the heat generated in the gas tube arrester 26 because of the sparking over of the spark gap between the line electrode 30 and the ground electrode 32 causes the fusible element 40 to melt. As illustrated in FIG. 4 of the drawings, when the fusible element 40 melts, the contact 38 moves toward the ground clip assembly 42 because of the resilient nature of the contact 38 and the manner in which it is biased toward the ground clip assembly 42. The ground contact surfaces 142 and 144 engage so that a metallic shunt path is formed between the pin 24 and the ground pin 20 through the leg portion 100 of the line contact 38, the contact surfaces 142 and 144 and the ground clip assembly 42. This metallic shunt path is maintained until a new protector module 10 is inserted or the fusible element 40 is replaced.

Advantageously, the protector module 10 enables the use of the three electrode gas tube arrester 26 in a protector module of the type used in telephone central offices or the like to interconnect incoming telephone lines to the central office and to also protect them. The protector module 10 also provides for easy installation of the components onto and adjacent the base 12 of the protector module 10. More specifically, each of the line pins 16, 18, 22 and 24, which are conductive, are easily insertable through the base 12 such that the line pins 16 and 18 can be secured to the leg portion 90 of the conductive line contact 34 and the pins 22 and 24 can be secured to the leg portion 100 of the conductive line contact 38. Likewise, the ground clip assembly 42 and the pin 20 secured thereon can easily be inserted through the hole 102 in the base 12.

The ground clip assembly 42 is also designed to readily secure the gas tube arrester 26 therein. The holding portion 108 can be readily expanded by exerting pressure on the clip portion 112 so that the gas tube arrester 26 can be mounted in the holding portion 108 with the ground electrode 32 extending into the annular groove 110. Once the gas tube arrester 26 is mounted therein, the clip portion 112 can be inserted into the cup portion 114 of the clip holding portion 104 so that the gas tube arrester 26 remains secure within the holding portion 108.

The protector module 10 also enables a relatively few components to be used while providing the metallic shunt circuits for the three electrode gas tube arrester 26 in the protector module 10 in the event of sustained overvoltage conditions. The contacts 34 and 38, when secured on the base 12 by the leg portions 90 and 100, respectively, have enough resiliency that they tend to be biased towards each other, and therefore towards the ground clip assembly 42 disposed between the line contacts 34 and 38. When the fusible elements 36 and 40 are positioned adjacent the line electrodes 28 and 30, respectively, the fusible element 36 forces the line contact 34, and thus the line contact surface 124, away from the ground clip assembly 42. Similarly, the fusible element 40 forces the line contact 38 and thus the line contact surface 132 away from the ground clip assembly 42. However, when either of these fusible elements 36 or 40 melt, the corresponding line contact 34 or 38 is allowed to move towards the ground clip assembly 42 so that the metallic shunt path through the contact surfaces 136 and 140 or 142 and 144 can be formed as illustrated in FIG. 4 of the drawings. This is done without having any external spring or like mechanism associated with the line contacts 34 and 38 to force them towards the ground clip assembly 42 to provide this metallic shunt circuit.

Although the present invention is described with reference to a single illustrative embodiment thereof, it should be understood that numerous other modifications and embodiments of the invention can be devised by those skilled in the art that will fall within the spirit and scope of the principles of this invention.

What is claimed as new and desired to be secured by Letters Patent of the United States is:

1. A protector module for protecting a circuit from high voltages or surge currents on said circuit, said module comprising:

an insulating base, terminal means on said base to be coupled to said circuit to be protected, ground terminal means extending from said base to be coupled to ground potential, an arrester having a ground electrode and at least one line electrode, at least one line contact means coupled to said terminal means and extending from said terminal means toward said line electrode, said line contact means having a first contact surface disposed intermediate said terminal means and said line electrode, a ground clip assembly coupled to and extending between said ground terminal means and said ground electrode such that said arrester is maintained in spaced relationship to said base, said ground clip assembly having a second contact surface disposed intermediate said ground terminal means and said ground electrode and adjacent to said first contact surface, and a fusible element having a positioning means extending therefrom to engage said line electrode to position said fusible element between said line contact means and said line electrode so as to normally maintain said first contact surface spaced apart from said second contact surface and coupling said line contact means to said line electrode, said first and second contact surfaces making contact whenever said fusible element is not held in position between said line contact means and said line electrode by said positioning means.

2. The protector module as set forth in claim 1 wherein said insulating base has first securing means and including an insulating shell having second securing means so that first and second securing means detachably secure said shell to said base such that said shell encompasses said arrester, said ground clip assembly, said line contact means, and said fusible element.

3. The protector module as set forth in claim 1 wherein said line contact means is generally L-shaped with one leg thereof secured to the base and to said terminal means and said other leg extends generally perpendicular away from said base.

4. The protector module as set forth in claim 1 wherein said terminal means include at least one pin having a portion extending through said base to be coupled to said line contact means.

5. The protector module as set forth in claim 1 wherein said ground clip assembly includes an arrester holding portion in which said arrester is mounted, said arrester holding portion having means to locate said arrester in generally parallel relationship with the plane of said base.

6. The protector module as set forth in claim 1 wherein said first contact surface is formed by a projecting portion on said line contact means.

7. A protector module to protect telephone lines from high voltage or surge currents occurring on said telephone lines, said protector module comprising:

a base of insulating material having first and second opposed sides, a pair of terminal means to be coupled to said telephone lines, said terminal means projecting from said first side of said base, a ground terminal means projecting from said first side of said base, a grounding means coupled to said ground terminal, said grounding means including retaining means, a gas tube arrester having a ground electrode and a pair of line electrodes, said gas tube arrester being coupled to said grounding means by said retaining means, a pair of line contact means, one of said line contact means being coupled to one of said terminal means and said other of said line contact means being coupled to said other terminal means, each of said line contact means being made of a resilient, electrically conductive material, a first fusible element disposed in electrical and heat relationship with and being in series relationship with and disposed between said one line contact means and one of said line electrodes, said first fusible element having a first stem portion extending into a first cavity in said one line electrode and a first flat disc portion between said one line electrode and said one line contact means so as to maintain said one line contact means spaced apart from said grounding means such that when said first fusible element melts said one line contact means moves relative to said grounding means whereby said one line contact means is coupled to said grounding means, and a second fusible element disposed in electrical and heat relationship with and being in series relationship with and disposed between said other line contact means and the other of said line electrodes, said second fusible element having a second stem portion extending into a second cavity in said other line electrode and a second flat disc portion between said other line electrode and said other line contact means so as to maintain said other line contact means spaced apart from said grounding means such that when said second fusible element melts said other line contact means moves relative to said grounding means whereby said other line contact means is coupled to said grounding means.

8. The protector module as set forth in claim 7 wherein said base has a plurality of holes through which said terminal means extend, wherein each of said line contact means is generally L-shaped with one leg of each of said line contact means being coupled to one of said terminal means and wherein said ground terminal means is a pin projecting from said first side of said base with a portion thereof extending through said base to be coupled to said grounding means.

9. The protector module as set forth in claim 7 wherein said each of said line contact means is generally L-shaped with one leg of said contact means being secured to the second side of said base and the other leg extends generally perpendicular from the second side of said base and adjacent said grounding means.

10. The protector module as set forth in claim 7 wherein said grounding means is a generally elongated conductive element having a generally circular holding portion at one end to receive the ground electrode of said gas tube arrester therein and a clip means so as to secure said gas tube arrester in said holding portion.

11. The protector module as set forth in claim 7 including a shell means to encompass said gas tube arrester, said grounding means, said line contact means and said first and second fusible elements, said shell being detachably secured to said base.

12. A protector assembly for protecting first and second telephone lines comprising:

a base means, first terminal means extending from said base to be coupled to said first telephone line, second terminal means extending from said base to be coupled to said second telephone line, ground means extending from said base, said ground means to be coupled to ground potential and including a retaining means and a pair of contact surfaces, a gas tube arrester having a central ground electrode and first and second opposed line electrodes, said ground electrode being retained by said retaining means, first line contact means coupled to said first terminal means, second line contact means coupled to said second terminal means, a first fusible element having a first stem portion and a first disc portion disposed between said first line electrode and said first line contact means, said first stem portion extending into a first cavity in said first line electrode and said first disc portion normally being maintained between said first line contact means and said first line electrode, said first stem portion positioning said first fusible element with respect to said first line electrode and said first line contact means such that said first line contact means is normally in spaced relationship to one of said contact surfaces, and a second fusible element disposed between said second line contact means and said second line electrode such that said second line contact means is normally in spaced relationship to the other of said contact surfaces.

13. The protector assembly as set forth in claim 12 wherein said base means has first and second sides with said first and second terminal means extending from said first side and said ground means having a ground terminal means extending from said first side and a ground clip assembly extending from said second side of said base means.

14. The protector assembly as set forth in claim 13 wherein said first and second line contact means extend from said second side of said base means adjacent said ground clip assembly, said first line contact means having a first leg portion coupled to said first terminal means and secured by said first terminal means to said second side of said base means, and said second line contact means having a second leg portion coupled to said second terminal means and secured to said base means by said second terminal means.

15. The protector assembly as set forth in claim 13 wherein said ground electrode has an annular ring projecting from said gas tube arrester and said ground clip assembly has an annular slot into which said ring extends to secure said gas tube arrester in said ground clip assembly, said ground clip assembly maintaining said gas tube arrester in spaced apart relationship to said second side of said base.

16. The protector assembly as set forth in claim 15 wherein said ground clip assembly includes clip means to enable said gas tube arrester to be positioned in said ground clip assembly.

17. The protector assembly as set forth in claim 12 wherein said first and second line contact means are made of a conductive, resilient material such that said first and second line contact means tend to move toward said ground clip assembly.

18. The protector assembly as set forth in claim 12 wherein said second fusible element has a second stem portion and a second disc portion, said second stem portion extending into a second cavity in said second line electrode and said second disc portion normally being maintained between said second line contact means and said second line electrode, said second stem portion positioning said second fusible element with respect to said second line electrode and said line contact means.

19. A protector module for protecting a circuit from high voltages or surge currents on said circuit, said module comprising:

an insulating base, terminal means on said base to be coupled to said circuit to be protected, ground terminal means extending from said base to be coupled to ground potential, an arrester having a ground electrode and at least a first line electrode, a ground clip assembly coupled to said ground terminal means and said ground electrode such that said arrester is maintained in spaced relationship to said base, at least a first line contact means coupled to said terminal means, and a first fusible means disposed between said first line contact means and said first line electrode, said first fusible means having a first disc means and a first positioning means extending from said first disc means into a first cavity in said first line electrode such that said first positioning means positions said first fusible means so that said first disc means maintains said first line contact means spaced apart from said ground clip assembly and couples said first line contact means to said first line electrode.

20. The protector module as set forth in claim 19 including a second line contact means, a second line electrode in said arrester, and a second fusible means disposed between said second line contact means and said second line electrode, said second fusible means having a second disc means and a second positioning means extending from said second disc means into a second cavity in said second line electrode such that said second positioning means positions said second fusible means so that said second disc means maintains said second line contact means spaced apart from said ground clip assembly and couples said second line contact means to said second line electrode.

* * * * *